United States Patent [19]
Zavala

[11] 4,078,307
[45] Mar. 14, 1978

[54] CLIPPER HAVING IMPROVED SHOCK ABSORBER

[76] Inventor: Antonio A. Zavala, 19750 W. Westside Blvd., Livingston, Calif. 95334

[21] Appl. No.: 687,128
[22] Filed: May 17, 1976
[51] Int. Cl.² ............................................. A01G 3/04
[52] U.S. Cl. ..................................................... 30/271
[58] Field of Search ................................... 30/271, 261

[56] References Cited

U.S. PATENT DOCUMENTS

| 630,670 | 8/1899 | Decelle | 30/271 X |
| 1,982,942 | 12/1934 | Albright | 30/271 |
| 2,105,332 | 1/1938 | Rauh | 30/271 |
| 2,373,757 | 4/1945 | Hart | 30/271 |

FOREIGN PATENT DOCUMENTS

| 986,271 | 3/1965 | United Kingdom | 30/271 |

*Primary Examiner*—Jimmy C. Peters
*Attorney, Agent, or Firm*—Townsend and Townsend

[57] ABSTRACT

A clipper having a pair of pivotally mounted cutter blades coupled to handles adapted to be grasped by both hands. A one-piece shock absorber of resilient material is mounted on one of the blades near the rear thereof for engagement by the other blade when the handles move together. The shock absorber has a slot which receives the first-mentioned blade.

2 Claims, 5 Drawing Figures

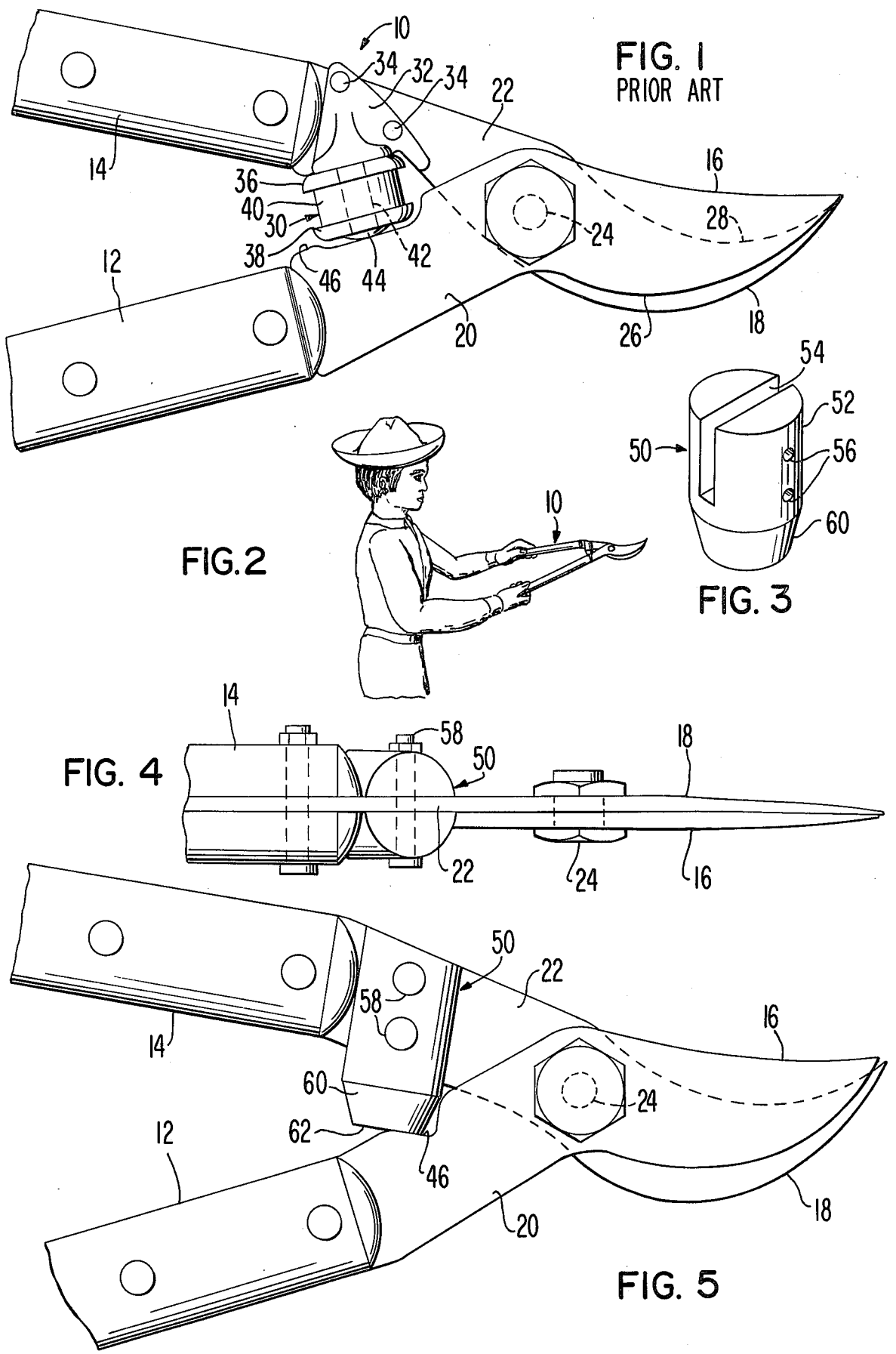

ation. Because the body absorbs substantially all of the shock, very little or none of the shock is transmitted through the handles, through the hands and arms and to the back muscles. Thus, there is very little or substantially no muscular fatigue due to such shock absorption and the workman can work longer periods of time before requiring rest periods.

CLIPPER HAVING IMPROVED SHOCK ABSORBER

This invention relates to improvements in the absorbing of shock by hand-held clippers when the clipper blades are closed when cutting a branch of a tree or bush and, more particularly, to a clipper having an improved shock absorber to minimize muscular fatigue.

BACKGROUND OF THE INVENTION

Conventional clippers used for cutting branches of grape vines, trees and the like are all generally of the type having wooden handles of about 15 to 18 inches long, the handles being connected to respective cutter blades and held in the hands in front of the body whereby the hands are moved toward and away from each other in a generally horizontal or inclined plane. A shock absorber is usually mounted near the rear of one of the blades for engagement by the rear portion of the other blade when the blades are brought together. Such shock absorber has a metal pin engaging a washer which is spaced from a second washer, and a rubber snubber is between the two washers. Thus, the rear of the other blade, being metal, strikes the metal pin to present a metal-to-metal contact notwithstanding the presence of the snubber between the washers. The pin, when it is struck by the other blade, moves the first washer toward the second washer and, in doing so, causes the snubber to compress. This supposedly absorbs some of the shock associated with the closing of the blades.

However, the metal-to-metal contact between the pin and the other blade creates a shock which is not fully absorbed by the snubber. A portion of this shock travels through the handles, through the hands and arms and to the back muscles of the workman using the clipper. Thus, the muscles of the arms and back must absorb this portion of the shock and this shock absorption by the muscles creates muscular fatigue requiring frequent rest period during a working day. As a result of this problem, a need has arisen for an improved shock absorber for a conventional clipper which, when the clipper blades are moved together, substantially eliminates or minimizes such muscular fatigue.

SUMMARY OF THE INVENTION

The present invention satisfies the foregoing need by providing an improved shock absorber of resilient one-piece construction which can be readily attached to the rear of one blade of a conventional clipper so that one end of the shock absorber itself makes direct contact with the rear of the other blade as the blades come together during a cutting operation. Thus, this construction avoids the metal-to-metal contact of conventional shock absorbers and the muscular fatigue problems which arise when the conventional shock absorbers are used on clippers of this type.

The shock absorber of the present invention includes a unitary body of hard rubber having a slot which receives the first blade. Pin means couples the body to the first blade while the body presents a resilient, non-metallic end face engageable by the second blade. When the second blade strikes the end face the shock is absorbed substantially completely by the body itself. Also, the restoring force of the body causes a rebound of the second blade away from the first blade to thereby assist in the separation of the blades for the next cutting operation. Because the body absorbs substantially all of the shock, very little or none of the shock is transmitted through the handles, through the hands and arms and to the back muscles. Thus, there is very little or substantially no muscular fatigue due to such shock absorption and the workman can work longer periods of time before requiring rest periods.

The primary object of this invention, is therefore, to provide an improved shock absorber for a clipper used for cutting branches of bushes, grape vines and trees or the like wherein the shock absorber is a resilient one-piece body which substantially completely absorbs the shock caused by a blade of the clipper striking the resilient body when the clipper blades are closed so as to prevent a part of the shock from traveling through the hands and arms to the back to thereby minimize muscular fatigue due to such shock.

Another object of this invention is to provide a clipper having an improved shock absorber of the type described wherein the shock absorber can be attached to existing clippers without substantial modification thereto, so that it can be used as a replacement part with a minimum of expense.

Other objects of this invention will become apparent as the following specification progresses, reference being had to the accompanying drawing for an illustration of an embodiment of the invention.

In the drawings:

FIG. 1 is a fragmentary side elevational view of a conventional clipper using a shock absorber of the prior art;

FIG. 2 is a side elevational view of the clipper having the shock absorber of the present invention, while the same is being used;

FIG. 3 is a perspective view of the improved shock absorber for the clipper;

FIG. 4 is a fragmentary end elevational view of the clipper and shock absorber of the invention; and FIG. 5 is a view similar to FIG. 1 but showing the clipper and shock absorber of the present invention.

A typical clipper shown in FIG. 1 is denoted by the numeral 10 and has a shock absorber of the prior art denoted by the numeral 30. Clipper 10 includes two long handles 12 and 14 of about 15 to 18 inches long. The handles are connected to respective metal cutter blades 16 and 18 by way of respective extensions 20 and 22. The cutter blades are pivotally mounted by a pin 24 for movement relative to each other when the handles are pulled apart and then moved toward each other. Blades 16 and 18 have respective cutting edges 26 and 28 which cooperated to cut branches of plants, trees, grape vines and the like when the tool is used in the manner shown in FIG. 2 with the hands grasping the outer ends of handles 12 and 14 and the clipper generally at waist height. Blades 16 and 18 are in their closed positions as shown in FIG. 2 but are opened when the hands are moved away from each other.

Shock absorber 30 is carried by a bracket 32 on extension 22 rearwardly of pin 24 by spaced pins 34. Shock absorber 30 includes a pair of metal washers 36 and 38 and an annular hard rubber snubber 40 between washers 36 and 38. A metal pin 42 extends through washers 36 and 38 and snubber 40 is shiftably received in a sleeve (not shown) on bracket 32. Pin 42 has a head 44 which engages the outer face of washer 38 and is adapted for engaging an end face 46 of extension 20 when the handles are brought together. Head 44 bears against the outer face of washer 38 because head 44 is larger than the pin-receiving hole through washer 38. Thus, when the handles are brought together, end face 46 will engage head 44 and pin 42 will cause washer 38 to move toward washer 36, causing compression of snubber 40 since pin 42 is free to shift in sleeve.

The problem arising due to the use of the prior art unit is the fact that extension 20 which is of metal strikes head 44 which is also of metal so that there is a metal-to-metal contact between these two elements notwithstanding the shock absorbing action of snubber 40. Over a relatively long period of time, such as several hours, a workman using the tool as shown in FIG. 2 will oftentimes develop back and arm pains, especially pains between the shoulder blades, and also will experience muscular fatigue. This is due to the metal-to-metal contact mentioned above and necessitates relatively frequent rest periods for the workman during a complete work shift.

The present invention is adapted to avoid the problem mentioned above with the prior art shock absorber by providing an improved shock absorber 50 for attachment to extension 22 at about the same location as shock absorber 30 so that it will be engageable with end face 46 of extension 20 when handles 12 and 14 are brought together. To this end, shock absorber 50 is comprised of a one-piece, generally cylindrical body 52 of relatively hard rubber or the like, the body typically having a length of 1½ to 1¾ inches and a diameter of about 1 inch. The material for body 52 is in the Durometer range of 40 to 90 and is available from a number of commercial outlets, including Delta Rubber Company, Inc., 225 West River Road, Modesto, California.

Body 52 has a slot 54 which receives extension 22, and a pair of holes 56 through the spaced side parts defined by slot 54 for receiving pins 58 for mounting body 52 on extension 22. The body has a beveled end surface 60 and an end face 62 for engagement with end face 46 of extension 20. The end face 62 is shown as being flat, however, it can be slightly crown-shaped or dome-shaped if desired.

The advantage of using shock absorber 50 is that it more positively absorbs the shock caused by closing the clipper blades and there is substantially no transmission of any portion of the shock to the handles, as in the prior art unit shown in FIG. 1.

This clearly reduces the fatigue on the back and arm muscles of the workman using the clipper and the workman can work for longer periods of time than he can with the clippers having the shock absorber 30 thereon.

Another advantage of using shock absorber 50 is that extension 20 rebounds immediately from end face 62 because the latter is resilient and the resilient part makes direct contact with end face 46. In the prior art shock absorber, the portion of the shock absorber engaging metallic end face 46 is also metallic so that there is no resilient member in direct contact with extension 20.

Shock absorber 50 can be used as a replacement for shock absorber 30 on existing clippers. Holes 56 in body 52 can be spaced to fit the corresponding holes in extension 22 which are provided to mount shock absorber 30.

The present invention, therefore, provides an improvement for clippers of the type described so that when such a clipper is used in the manner shown in FIG. 2 there will be less body pain and fatigue of the muscles of the body, yet work periods can be completed without the need for frequent work stoppages for rest periods.

I claim:

1. A shock absorber for a clipper of the type having a pair of pivotally mounted cutter blades having rear extensions connected to respective handles comprising: a one-piece, solid, generally cylindrical body of resilient material, said body having a pair of opposed ends and a slot extending into one end thereof to present a pair of spaced, opposed sides, said body having and end part between the inner end of the slot and the opposite end of the body, said end part being integral with said sides and having an outer end face, the body adapted to be mounted on the extension of one of the blades with the extension received with the slot and with the sides of the body in proximity to the sides of the extension, each side of the body having a pair of holes therethrough, the holes on one side being aligned with respective holes on the other side so that the holes can receive respective fasteners passing through the extension of said one blade, said end part projecting outwardly from said extension of said one blade and said end face being disposed for direct engagement with the extension of the other blade when the handles are moved to close the blades and when said sides of the body are secured by said fastener to the extension of said one blade.

2. In combination: a clipper having a pair of pivotally mounted cutter blades with each blade having a rear extension, and a pair of handles connected to the extensions of respective blades, one of the extensions having a pair of spaced holes therethrough; a one-piece, solid, generally cylindrical body of resilient material having a pair of opposed ends and a slot extending into one end thereof to present a pair of spaced, opposed sides, said body having an end part between the inner end of the slot and the opposite end of the body, said end part being integral with said sides and having an outer end face, the body being mounted on said clipper with said one of the extensions received within the slot and with the sides of the body in proximity to the sides of the one extension, each side of the body having a pair of spaced holes therethrough, the holes of one side being aligned with respective holes of the other side and with respective holes in said one extension, said one part projecting outwardly from said one extension and toward the other extension; and a pair of fasteners coupled with said sides of the body and extending through respective holes in said sides and said one extension for securing the sides to said one extension, whereby said end face will be directly engaged by the other extension when the handles are moved to close the blades.

* * * * *